United States Patent
Ilyasov (10) Patent No.: US 7,484,083 B1
(45) Date of Patent: Jan. 27, 2009

(54) METHOD, APPARATUS, AND COMPUTER-READABLE MEDIUM FOR UTILIZING BIOS BOOT SPECIFICATION COMPLIANT DEVICES WITHIN AN EXTENSIBLE FIRMWARE INTERFACE ENVIRONMENT

(75) Inventor: Oleg Ilyasov, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 468 days.

(21) Appl. No.: 11/245,518

(22) Filed: Oct. 7, 2005

(51) Int. Cl.
*G06F 9/00* (2006.01)
*G06F 15/177* (2006.01)

(52) U.S. Cl. .................... 713/1; 713/2; 713/100
(58) Field of Classification Search ........... 713/1
See application file for complete search history.

(56) References Cited

U.S. PATENT DOCUMENTS

2004/0268368 A1* 12/2004 Doran et al. ............ 719/321

2006/0020780 A1* 1/2006 Hobson ................. 713/2

OTHER PUBLICATIONS

Compaq Computer Corporation, Phoenix Technologies Ltd., and Intel Corporation: "BIOS Boot Specification," Version 1.01, Jan. 11, 1996.

* cited by examiner

*Primary Examiner*—Thuan N Du
*Assistant Examiner*—Michael J Brown
(74) *Attorney, Agent, or Firm*—Hope Baldauff Hartman, LLC (57) ABSTRACT

A method, apparatus, and computer-readable medium for utilizing devices compliant with the BIOS boot specification ("BBS") from within an EFI environment are provided. According to one method, an option ROM initialization procedure is executed to obtain a boot connection vector for each BBS compliant device. The boot connection vector for each device is executed to obtain a pointer to program code within the option ROM for accessing each device. When a request is received from within an EFI environment to access a device, the appropriate pointer for accessing the device and an interrupt thunk are utilized to access the requested device from within the EFI environment. The post-initialization state of memory used by the option ROM may also be saved and restored prior to booting a legacy operating system from the EFI environment.

14 Claims, 9 Drawing Sheets

Fig. 7 ing. This hardware support comes in the form of initialization and runtime firmware contained on a BIOS option read-only memory ("ROM") located on the device itself.

METHOD, APPARATUS, AND COMPUTER-READABLE MEDIUM FOR UTILIZING BIOS BOOT SPECIFICATION COMPLIANT DEVICES WITHIN AN EXTENSIBLE FIRMWARE INTERFACE ENVIRONMENT

TECHNICAL FIELD

The present invention is related to BIOS boot specification compliant devices. More particularly, the present invention is related to utilizing BIOS boot specification compliant devices from within an extensible firmware interface environment.

BACKGROUND OF THE INVENTION

In many computing systems, low level instruction code is used as an intermediary between the hardware components of the computing system and the operating software and other high level software executing on the computing system. In some computer systems, this low level instruction code is known as the Basic Input/Output System ("BIOS"). The BIOS provides a set of software routines that allow high level software to interact with the hardware components of the computing system using standard calls. BIOS-compatible firmware implementations may be referred to herein as "legacy BIOS."

Because of limitations of the BIOS utilized in many PC-compatible computers, a new specification for the firmware that is responsible for booting the computer and for intermediating the communication between the operating system and the hardware has been proposed. The new specification is called the Extensible Firmware Interface ("EFI") specification and is available from INTEL CORPORATION.

The EFI specification describes an EFI environment that provides an interface between the operating system and the system firmware. In particular, the EFI specification defines the interface that platform firmware must implement and the interface that the operating system may use in booting. How the firmware implements the interface is left up to the manufacturer of the firmware. The EFI specification provides protocols for EFI drivers to communicate with each other, and the EFI core provides functions such as allocation of memory, creating events, setting the clock, and many others. This is accomplished through a formal and complete abstract specification of the software-visible interface presented to the operating system by the platform and the firmware.

In general, EFI-compatible systems are built from a collection of EFI drivers. Drivers may be responsible for managing a device (a device driver), a bus (a bus driver), or for implementing a particular technology (a technology driver). It may be necessary to develop one of each type of driver to implement support for a single device type. For example, in order to implement support for small computer systems interface ("SCSI") storage devices, it is necessary to develop an EFI SCSI bus driver, an EFI SCSI controller chipset driver, an EFI SCSI device block input/output driver, and potentially other drivers.

Typically, the manufacturer of a device will provide the appropriate drivers for the device in the particular environment. For instance, the driver for a SCSI controller chipset is typically provided by the manufacturer of the controller. However, EFI-compatible drivers are not always available from the device manufacturer. This is particularly true in the case of a new firmware environment, such as EFI, wherein support is initially very limited. On the other hand, hardware support is almost always available for legacy BIOS environments. This hardware support comes in the form of initialization and runtime firmware contained on a BIOS option read-only memory ("ROM") located on the device itself.

Legacy BIOS is designed to execute available option ROMs and to supply the necessary interrupt servicing functions. EFI, in contrast, is not designed to directly execute the option ROM firmware. EFI operates in the CPU protected mode execution environment while option ROMs are designed to be executed in the CPU real mode execution environment. Many legacy BIOS option ROMs also require hardware interrupts, which the EFI environment does not support. For these reasons, many devices that implement firmware support using option ROMs are unusable within an EFI environment if no EFI-compatible driver is available.

In order to enable the EFI firmware executing in the CPU protected mode execution environment and the option ROM executing in the CPU real mode environment to communicate and exchange data, an interrupt thunk driver has been developed. The interrupt thunk is designed to switch the CPU execution mode between protected mode and real mode, and to utilize a buffer to transfer data between the two modes. While utilization of an interrupt thunk does allow execution of option ROM firmware within an EFI environment, there are still certain categories of devices that remain inaccessible. For instance, devices supported by option ROMs compatible with the BIOS boot specification ("BBS") are not accessible.

The BBS defines a feature within legacy BIOS that creates and maintains a list of all of the initial program load ("IPL") devices found in the system and stores this list in non-volatile memory. IPL devices may be mass storage devices, network devices, or other types of devices. The BBS also defines several phases of operation for a compatible option ROM. For instance, a BBS-compliant SCSI peripheral component interconnect ("PCI") option ROM utilizes an initialization phase, a connection phase, and a run-time operation phase. In the initialization phase, the option ROM performs the controller hardware initialization and scans the bus to identify any connected devices. In the connection phase, the option ROM executes connection code for each of the devices and inserts the appropriate entry points for accessing the devices into an interrupt vector table. In the run-time operation phase, the option ROM receives and responds to requests to read and write data on a connected device. These three phases are interdependent in that run-time operations are not possible prior to the connection phase, and the connection phase is not allowed prior to the initialization phase.

The EFI specification requires controllers to remain in the initialization phase until the system is requested to perform a legacy boot. As a result, run-time operation is not possible prior to booting a legacy operating system ("OS"). Therefore, devices supported by BBS-compliant option ROMs, such as SCSI hard drives, are not accessible from within the EFI environment. It is with respect to these considerations and others that the various embodiments of the invention have been made.

SUMMARY OF THE INVENTION

In accordance with the present invention, the above and other problems are solved by providing a method, computer-readable medium, and apparatus for enabling the use of BBS-compliant devices within an EFI environment. Through the embodiments of the invention, BBS-compliant devices can be accessed from within an EFI environment. The same devices are also available in a normal fashion to an operating system once it is booted from within the EFI environment.

According to one aspect of the invention, a method is provided for enabling the use of one or more BIOS boot specification compliant devices within an EFI environment. According to one method, an option ROM configured to provide support for one or more BBS compliant devices is initialized from within the EFI environment. During initialization, the option ROM identifies any connected devices and identifies a boot connection vector ("BCV") for each device. The BCV comprises an entry point into code in the option ROM for initializing a device and for returning a pointer to code in the option ROM for accessing the device.

Once a BCV has been identified for each device, the BCV is executed to obtain the pointer for each device to program code for accessing the device. The pointer to the access code is stored for each device. According to embodiments, an instance may be created of a block input/output ("I/O") driver for each device, and the pointer for each device may be stored in the corresponding instance. Subsequently, each instance may be called to access a desired device and the pointer stored therein may be utilized to locate the appropriate program code for accessing the device.

The execution of the BCV typically causes a variable describing the number of connected devices to be incremented. However, according to embodiments of the invention, the value of this variable is set to zero following the execution of each BCV. In this manner, each device is initialized as if it were the only connected device. Additionally, execution of each BCV also includes saving the previous entry point in the appropriate interrupt chain and adding the pointer to the access code to the interrupt chain. However, according to embodiments of the invention, a default value is stored in the interrupt chain following the execution of each BCV. The default value causes the interrupt to return immediately after executing the access code for a device rather than stepping through the interrupt chain. By setting the value of the variable describing the number of devices to zero and substituting a default value into the interrupt chain following the execution of each BCV, the computer system is configured so that each device may be accessed from within the EFI environment as if it were the only connected device.

Once each of the BCVs have been executed, requests may be received within the EFI environment to access a specific device. For instance, requests may be received from applications executing within the EFI environment to read or write to a connected BBS compliant storage device. In response to such a request, the stored pointer to the program code for accessing the requested device is read. The pointer is then substituted into a location in the appropriate interrupt vector table for accessing the first connected device. The requested access operation may then be performed from within the EFI environment by utilizing an interrupt thunk and the appropriate interrupt for accessing the device. Because the interrupt chain is created utilizing default values for each device, the access is performed on the requested device and the interrupt immediately returns. In this manner, each device is treated as if it is the only device connected in the system.

According to other aspects of the method, the contents of memory prepared during the option ROM initialization may be stored prior to executing the BCV for each connected device. When a request is subsequently received from within the EFI environment to boot into an operating system, the saved contents of memory may be restored. In this manner, the operating system may operate in a normal fashion without being affected by the utilization of the devices within the EFI environment.

According to other aspects of the invention, a computer-readable medium is provided having computer executable instructions stored thereon, which when executed by a computer, cause the computer to enable the use of BBS compliant devices from within an EFI environment. In particular, the computer executable instructions cause the computer to execute an option ROM initialization procedure to identify one or more connected BBS compliant mass storage devices, such as SCSI hard disk drives. The option ROM initialization procedure also identifies a BCV for each of the identified devices. The computer readable instructions then cause the computer to execute the BCV for each device to obtain a pointer to program code for accessing the device. The pointers may be stored in instances of a block I/O driver corresponding to each device. Following the initialization of each BCV, the value of a variable describing the number of connected devices is set to zero. Additionally, a default value is stored in a device access interrupt entry point following the execution of each BCV. In this manner, each device is configured as if it is the only connected device.

The computer-executable instructions are also operative to cause the computer to receive a request to access one of the devices from within an EFI environment. In response to such a request, the computer executable instructions cause the computer to identify the appropriate pointer to the access code for the requested device, and to utilize an interrupt thunk from within the EFI environment to access the device. According to embodiments, the computer executable instructions are also operative to cause the computer to save the contents of a memory prepared by during the option ROM initialization procedure prior to executing any BCVs. The saved contents of the memory may be restored prior to booting a legacy operating system.

According to other aspects of the invention, a computer system is provided that is operable to provide access to BBS compliant mass storage devices from within an EFI environment. According to embodiments, the computer system includes a BBS compliant mass storage device controller. The controller includes an option ROM storing program code for initializing, connecting, and accessing one or more mass storage devices connected to the controller. The computer system also includes one or more mass storage devices connected to the controller, a central processing unit, a random access memory, and a non-volatile memory storing an EFI firmware.

The EFI firmware is operative to cause the option ROM to initialize any connected devices and to provide a BCV for each connected device. The EFI firmware then executes the BCV for each connected device to obtain a pointer to program code for accessing each device. Following the execution of each BCV, the EFI firmware sets the value of a variable describing the number of connected devices to zero. Additionally, the EFI firmware stores a default value in a device access interrupt entry point following the execution of each BCV.

The EFI firmware may also receive a request to access one of the BBS compliant storage devices. In response to such a request, the EFI firmware is operative to utilize the pointer to code for accessing the requested device and an interrupt thunk to perform the requested access. According to other embodiments, the EFI firmware is operative to save the contents of memory prepared by the option ROM during initialization and to restore the saved contents just prior to booting a legacy operating system. In this manner, the state of the computer system will be presented to the operating system in the same condition it would have been had the BBS compliant drives not been made accessible from within the EFI environment.

The above-described aspects of the invention may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Embodiments of the present invention provide methods, systems, apparatus, and computer-readable media for enabling access to BBS compliant devices in an EFI environment. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 1:
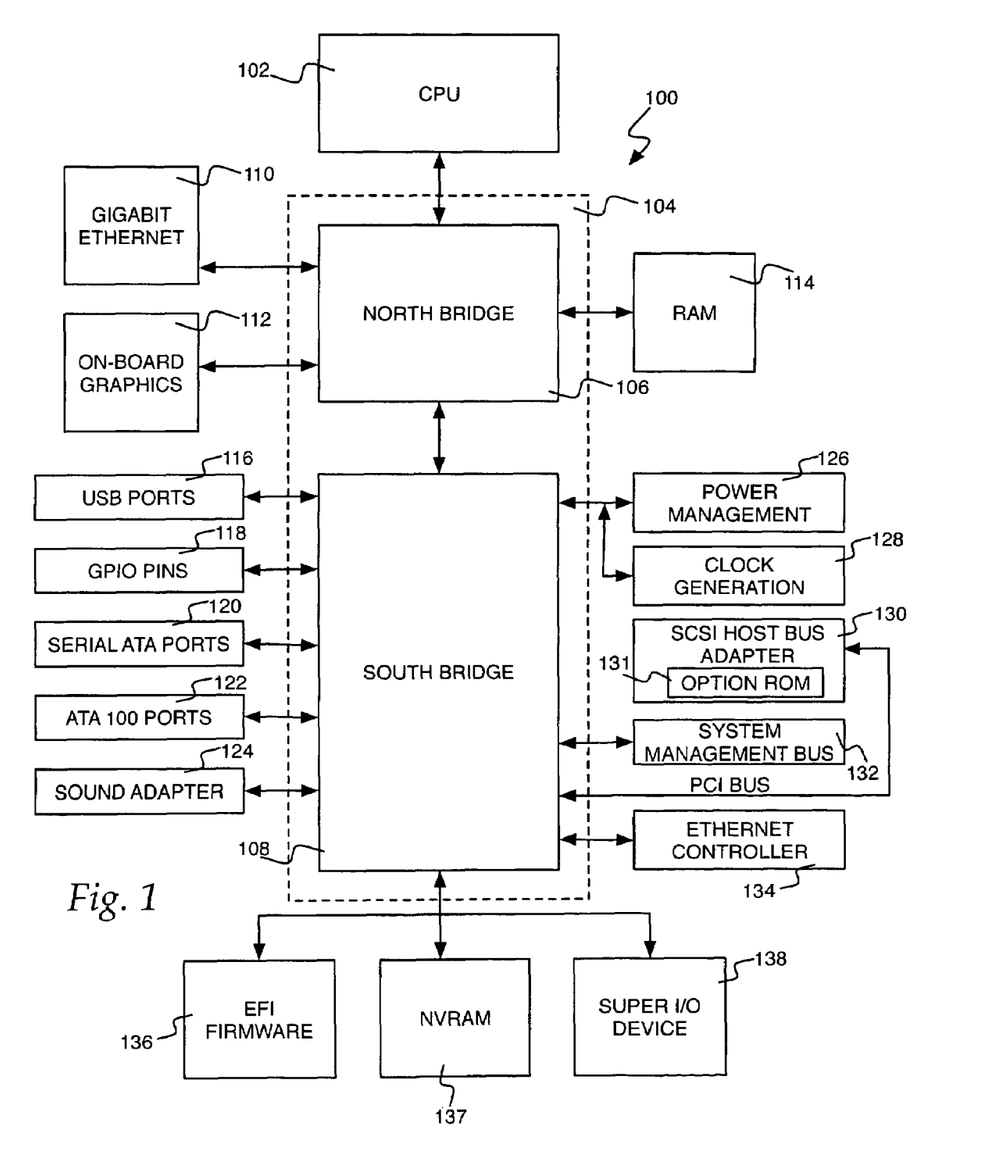
FIG. 1 is a computer architecture diagram showing aspects of a computer architecture utilized in the various embodiments of the invention.

FIG. 1 and the following discussion are intended to provide a brief, general description of a suitable computing environment in which the invention may be implemented. While the invention will be described in the general context of program modules that execute in conjunction with an EFI firmware, those skilled in the art will recognize that the invention may also be implemented in combination with other types of program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments of the present invention will be described. It should be appreciated that although the embodiments of the invention described herein are discussed in the context of a conventional desktop or server computer, the embodiments of the invention may be utilized with virtually any type of computing device. FIG. 1 shows an illustrative computer architecture for a computer 100 that is operative to enable access to BBS compliant devices from within an EFI environment. It should be appreciated that although the embodiments of the invention are described herein as providing access to BBS compliant mass storage devices, such as SCSI hard disk drives, other types of BBS devices may accessed from within an EFI environment utilizing the embodiments of the invention. For instance, a BBS compliant network device may be accessed from within EFI in a manner similar to that described herein.

In order to provide the functionality described herein, the computer 100 includes a baseboard, or "motherboard", which is a printed circuit board to which a multitude of components or devices may be connected by way of a system bus or other electrical communication path. In one illustrative embodiment, a central processing unit ("CPU") 102 operates in conjunction with a chipset 104. The CPU 102 is a standard central processor that performs arithmetic and logical operations necessary for the operation of the computer.

The chipset 104 includes a north bridge 106 and a south bridge 108. The north bridge 106 provides an interface between the CPU 102 and the remainder of the computer 100. The north bridge 106 also provides an interface to the random access memory ("RAM") 114 and, possibly, an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a bus for interfacing peripheral card devices such as a BBS compliant SCSI host bus adapter 130. In one embodiment, the bus comprises a peripheral component interconnect ("PCI") bus. The south bridge 108 may also provide a system management bus 132 for use in managing the various components of the computer 100. Power management circuitry 126 and clock generation circuitry 128 may also be utilized during the operation of the south bridge 108.

The south bridge 108 is also operative to provide one or more interfaces for connecting mass storage devices to the computer 100. For instance, according to an embodiment, the south bridge 108 includes a serial advanced technology attachment ("ATA") adapter for providing one or more serial ATA ports 120 and an ATA 100 adapter for providing one or more ATA 100 ports 122. The serial ATA ports 120 and the ATA 100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

One or more BBS compliant mass storage devices may also be connected to the SCSI host bus adapter 130. As known to those skilled in the art, the BBS defines a feature within legacy BIOS that creates and maintains a list of all of the initial program load ("IPL") devices found in the system and stores this list in non-volatile memory. IPL devices may be mass storage devices, network devices, or other types of devices. The BBS also defines several phases of operation for a compatible option ROM. Additional details regarding the BBS can be found in the BIOS Boot Specification, version 1.01, available from INTEL CORPORATION, and which is expressly incorporated herein by reference.

The mass storage devices connected to the south bridge 108 and the SCSI host bus adapter 130, and their associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a read-only memory ("ROM") device for storing an extensible firmware interface ("EFI") firmware 136 that includes program code containing the basic routines that help to start up the computer 100 and to transfer information between elements within the computer 100. Additional details regarding the operation of the EFI firmware 136 is provided below with respect to FIGS. 2-7. The LPC interface may also be utilized to connect a non-volatile random access memory ("NVRAM") 137 to the computer 100. The NVRAM 137 may be utilized by the EFI firmware 136 to store configuration data for the computer 100.

As shown in FIG. 1, the SCSI host bus adapter 130 may include a BBS compliant option ROM 131. As described in detail herein, the option ROM 131 is operative to connect, initialize, and provide run-time access to any devices connected to the controller 131. For instance, the option ROM 131 may utilize an initialization phase, a connection phase, and a run-time operation phase. In the initialization phase, the option ROM 131 performs the controller hardware initialization and scans the bus to identify any connected devices. In the connection phase, the option ROM 131 executes connection code for each of the devices and inserts the appropriate entry points for accessing the devices into an interrupt vector table. In the run-time operation phase, the option ROM 131 receives and responds to requests to read and write data on a connected device. These three phases are interdependent in that run-time operations are not possible prior to the connection phase, and the connection phase is not allowed prior to the initialization phase. Additional details regarding the operation of the option ROM 131 in performing these functions will be described below with respect to FIGS. 5A-5C.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
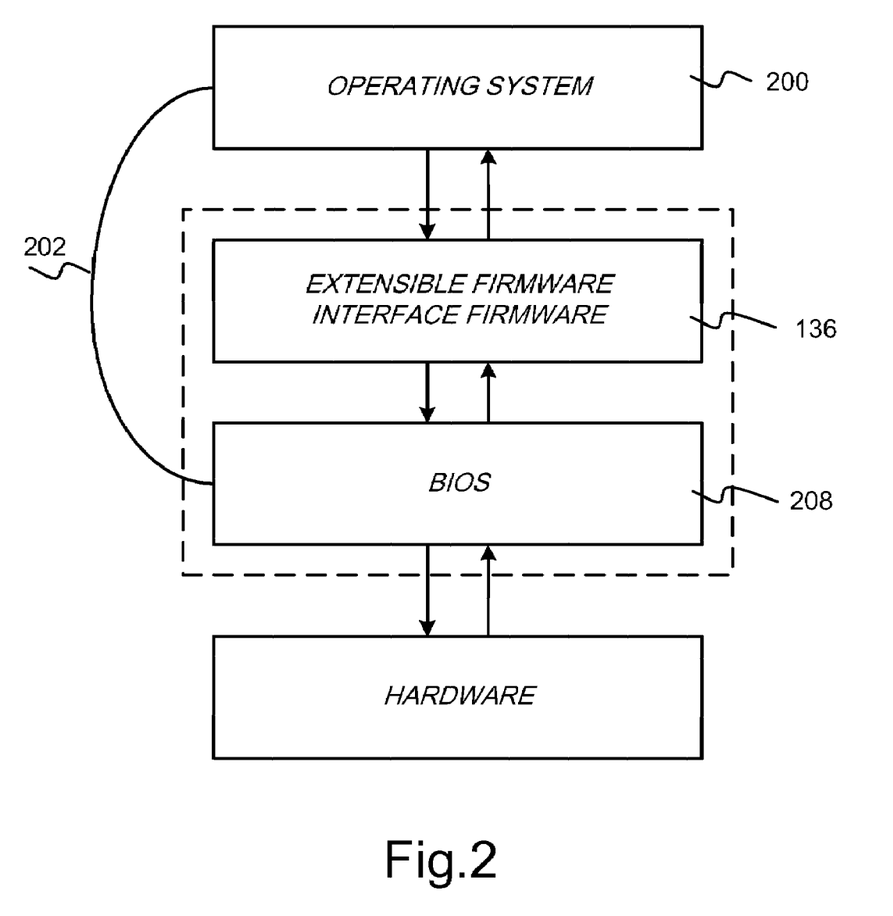
FIGS. 2 and 3 are computer hardware and software architecture diagrams illustrating aspects of an EFI environment that provides an operating environment for the various embodiments of the invention.

Referring now to FIG. 2, additional details regarding the operation of the EFI firmware 136 of the computer 100 will be described. In particular, the firmware 136 comprises a firmware compatible with the EFI specification from INTEL CORPORATION. The EFI specification describes an interface between the operating system 200 and the firmware 136. The EFI specification defines the interface that platform firmware must implement, and the interface that the operating system 200 may use in booting. How the firmware 136 implements the interface is left up to the manufacturer of the firmware 136. The intent of the specification is to define a way for the operating system 200 and firmware 136 to communicate only information necessary to support the operating system boot process. This is accomplished through a formal and complete abstract specification of the software-visible interface presented to the operating system by the platform and the firmware.

According to one implementation of EFI on INTEL CORPORATION IA-32 platforms, both the EFI firmware 136 and a BIOS 208 may be presented in the firmware. This allows users and system integrators to support both firmware interfaces. In order to provide this functionality, an interface 202 may be provided for use by legacy operating systems and applications. Additional details regarding the architecture and operation of the EFI firmware 136 for enabling access to BBS compliant devices from within the EFI environment are provided below with respect to FIGS. 3-7. Moreover, additional details regarding the operation and architecture of EFI can be found in the EFI specification which is available from INTEL CORPORATION end expressly incorporated herein by reference. It should be appreciated that the firmware 136 may include only an EFI-compatible firmware. It should also be appreciated that the "EFI environment" referred to herein comprises the run-time environment provided by the firmware 136.

Figure 3:
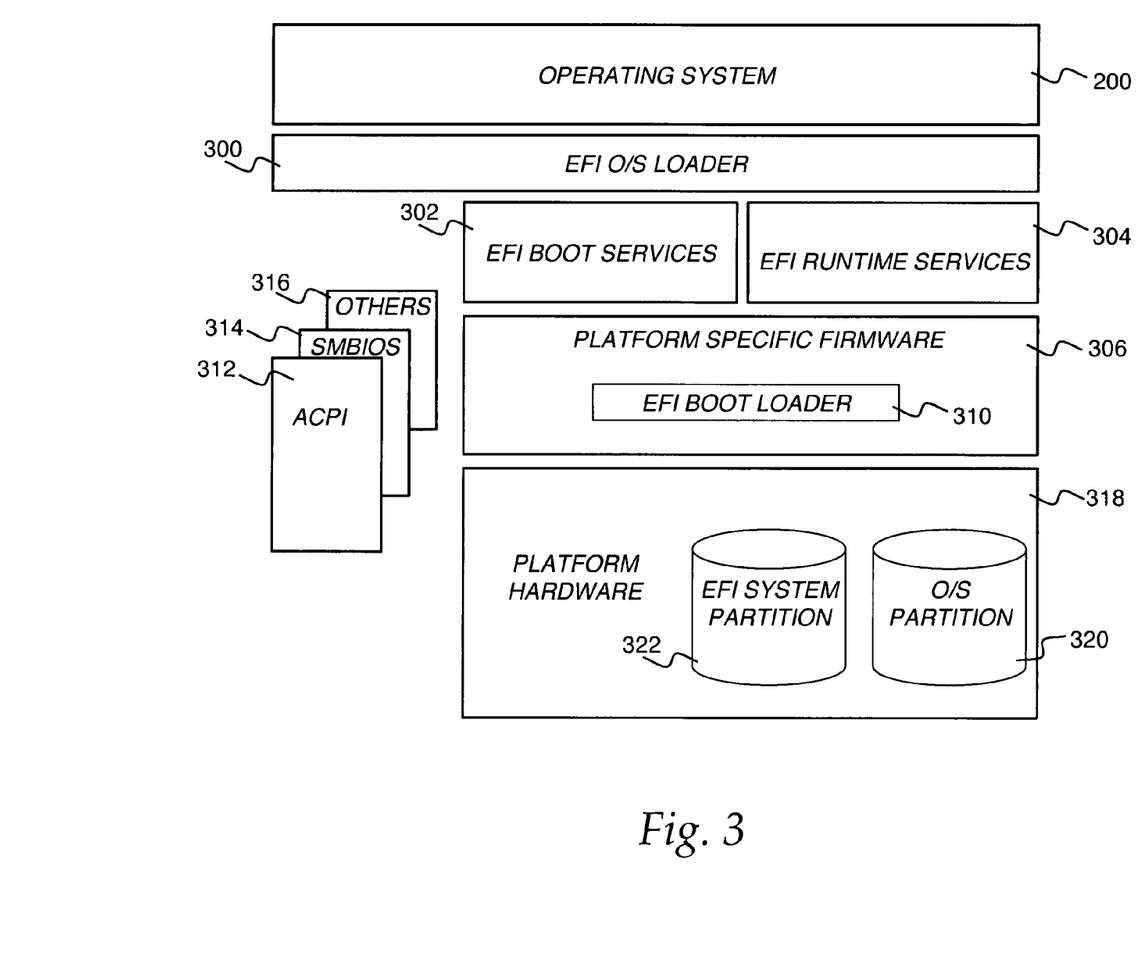

Turning now to FIG. 3, additional details regarding an EFI specification-compliant system utilized to provide an operating environment for the various embodiments of the invention will be described. As shown in FIG. 3, the system includes platform hardware 318 and an operating system 200. The platform firmware 306 may retrieve an OS image from the EFI system partition 322 using an EFI O/S loader 300. The EFI system partition 322 may be an architecturally shareable system partition. As such, the EFI system partition 322 defines a partition and file system that are designed to allow safe sharing of mass storage between multiple vendors. An O/S partition 320 may also be utilized.

Once started, the EFI O/S loader 300 continues to boot the complete operating system 200. In doing so, the EFI O/S loader 300 may use EFI boot services 302 and interfaces to other supported specifications to survey, comprehend, and initialize the various platform components and the operating system software that manages them. Thus, interfaces 312, 314, and 316, from other specifications may also be present on the system. For example, the Advanced Configuration and Power Management Interface ("ACPI") and the System Management BFOS ("SMBIOS") specifications may be supported.

EFI boot services 302 provides interfaces for devices and system functionality that can be used during boot time. EFI runtime services 304 may also be available to the O/S loader 300 during the boot phase. For example, a minimal set of runtime services may be presented to ensure appropriate abstraction of base platform hardware resources that may be needed by the operating system 200 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 310 at system boot time. The EFI boot loader 310 is a component in the EFI firmware that determines which program modules should be explicitly loaded and when. Once the EFI firmware is initialized, it passes control to the boot loader 310. The boot loader 310 is then responsible for determining which of the program modules to load and in what order.

The EFI specification requires controllers to remain in their initialization phase until the system is requested to perform a legacy boot. As a result, run-time operation is not possible prior to booting a legacy operating system ("OS"). Therefore, devices supported by BBS-compliant option ROMs, such as SCSI hard drives, are not typically accessible during run time operation of the EFI firmware 136. As will be described in detail with regard to FIGS. 4-7, the embodiments of the invention permit BBS compatible devices to be accessed during run time of the EFI firmware 136.

Figure 4:
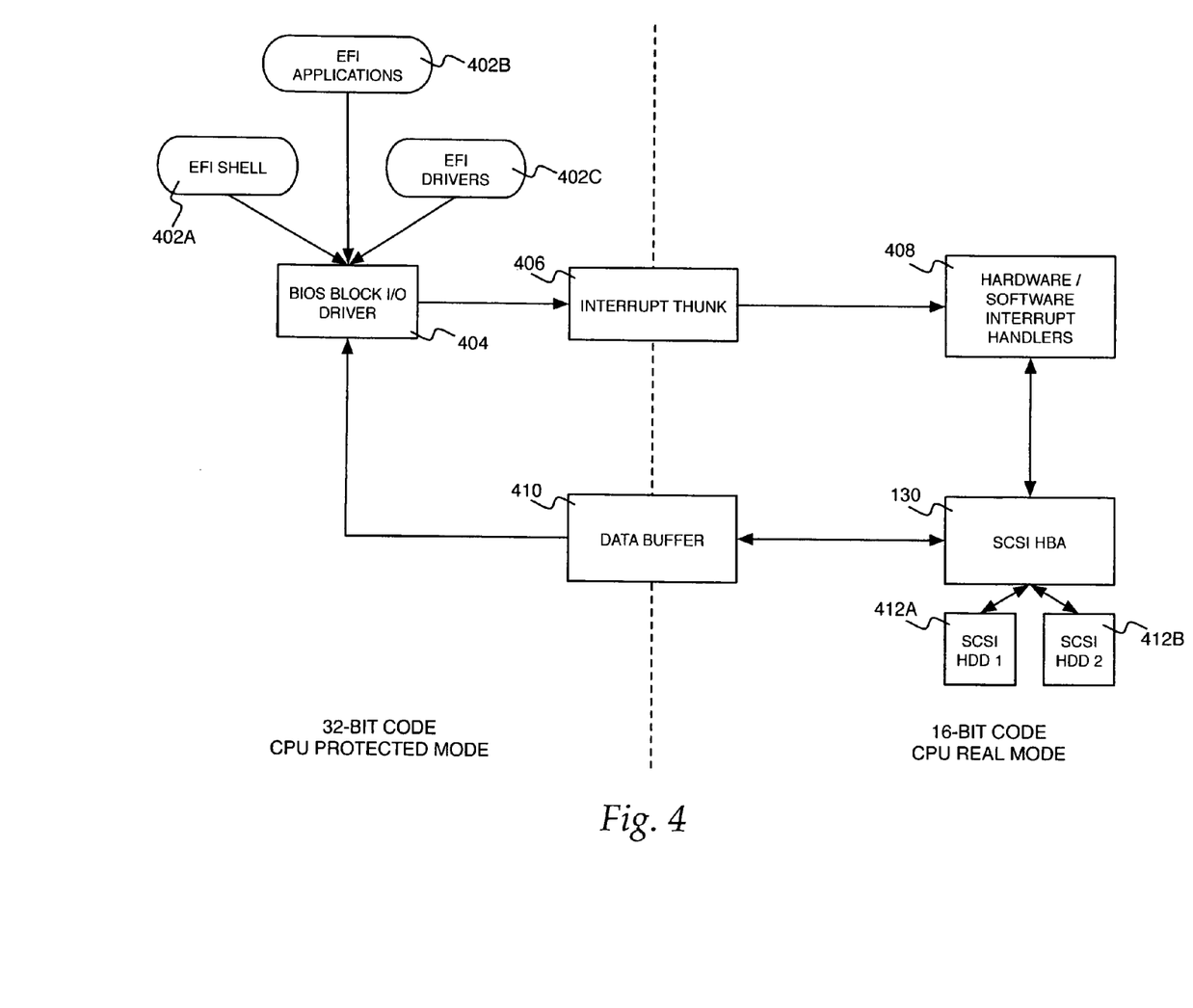
FIG. 4 is a software and hardware architecture showing aspects of an EFI for providing an interrupt thunk.

Referring now to FIG. 4, additional details regarding the operation of the EFI firmware 136 will be provided. As discussed briefly above, legacy BIOS was designed to execute available option ROMs and to supply the necessary interrupt servicing functions for accessing the functionality of the option ROMs. EFI, in contrast, is not designed to directly execute the option ROM firmware. On IA-32 platforms, EFI operates in the 32-bit CPU protected mode execution environment while option ROMs are designed to be executed in the 16-bit CPU real mode execution environment. Many legacy BIOS option ROMs also require hardware interrupts, which the EFI environment does not support. For these reasons, many devices that implement firmware support using option ROMs are unusable within an EFI environment if no EFI-compatible driver is available.

In order to enable the EFI firmware executing in the 32-bit CPU protected mode execution environment and the option ROM executing in the 16-bit CPU real mode environment to communicate and exchange data, an interrupt thunk driver 406 has been developed. The interrupt thunk 406 is designed to switch the CPU execution mode between 32-bit protected mode and 16-bit real mode, and to utilize a data buffer 410 to transfer data between the two modes. In particular, a BIOS block I/O driver 404 is provided that is operative to receive calls from programs executing within the EFI run time environment, such as the EFI shell 402A, EFI applications 402B, and EFI drivers 402C. The BIOS block I/O driver 404, in turn, calls the interrupt thunk 406. The interrupt thunk 406 switches the operation of the CPU 102 from protected mode to real mode, and calls the appropriate hardware/software interrupt handlers 408. In particular, in the case of accessing a mass storage device on an IA-32 platform, the interrupt thunk 406 may call the standard interrupt 13h ("INT 13h"). In turn, the hardware/software interrupt handlers 408 call the appropriate portion of the option ROM in the host bus adapter 130 to access the appropriate hard disk drive 412A-412B. Data to be returned from the controller 130 is placed into a buffer 410 utilized by the interrupt thunk 406 to return the data to the appropriate driver 404. Once the operation has been completed, the interrupt thunk 406 returns the state of the CPU 102 to protected mode operation. Additional details regarding the processes provided herein for accessing a BBS compliant device from within the EFI environment are provided below with respect to FIGS. 5A-7.

Figure 5A:
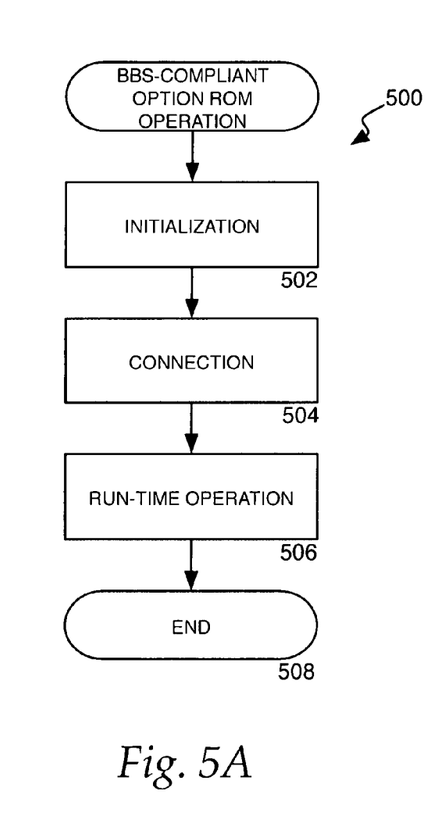
FIG. 5A is a flow diagram illustrating aspects of the initialization of a BBS-compliant option ROM utilized in embodiments of the invention.
Figure 5B:
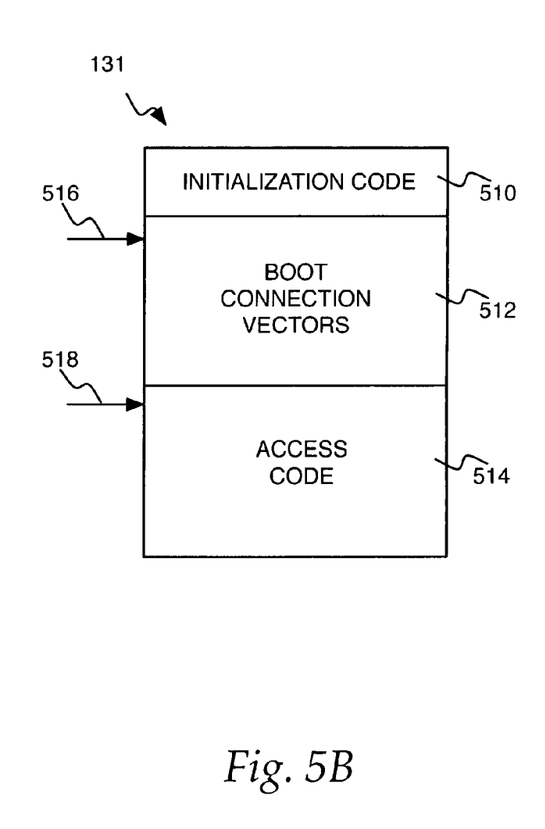
FIGS. 5B-5C are block diagrams illustrating additional aspects of the initialization of a BBS-compliant option ROM utilized in embodiments of the invention.

Turning now to FIGS. 5A and 5B, an illustrative routine 500 will be described illustrating the typical operation of a BBS-compliant option ROM 131 utilized in one embodiment of the invention. It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIGS. 5A and 6A-6B and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 500 begins at operation 502, where initialization code 510 within the option ROM 131 is called. The initialization code 510 is operative to detect and identify all of the devices connected to the controller 130. Additionally, the initialization code 510 is operative to return a BCV 516 for each of the connected drives. It should be appreciated that a number of BCVs 512 are available, but only BCVs for connected drives are returned.

Once the initialization code 510 has been executed, the routine 500 continues to operation 504, where the option ROM 131 is called to perform the connection process. In particular, the code identified by each BCV 516 may be executed in order to initialize each device. In response, the option ROM 131 initializes the indicated device and returns a pointer 518 to program code 514 for accessing the device ("access code"). The pointer 518 is utilized to access the program code 514 for accessing the associated device. It should be appreciated that the BCV 516 for each connected device are executed sequentially. During execution of each BCV, it should be appreciated that a variable maintained by the BIOS that indicates the number of connected devices is incremented. Moreover, the pointer 518 to the access code for the device is added to an interrupt chain. As will be described in greater detail below, aspects of the invention reset the variable indicating the number of drives in the system and modify the contents of the interrupt chain to enable access of the devices in an EFI environment.

Once the connection process has been performed, the routine 500 continues to operation 506, where run time operation is performed. During run time operation, the pointer 518 for each device is utilized by the interrupt mechanism to access each device. From operation 506, the routine 500 continues to operation 508, where it ends.

Figure 5C:
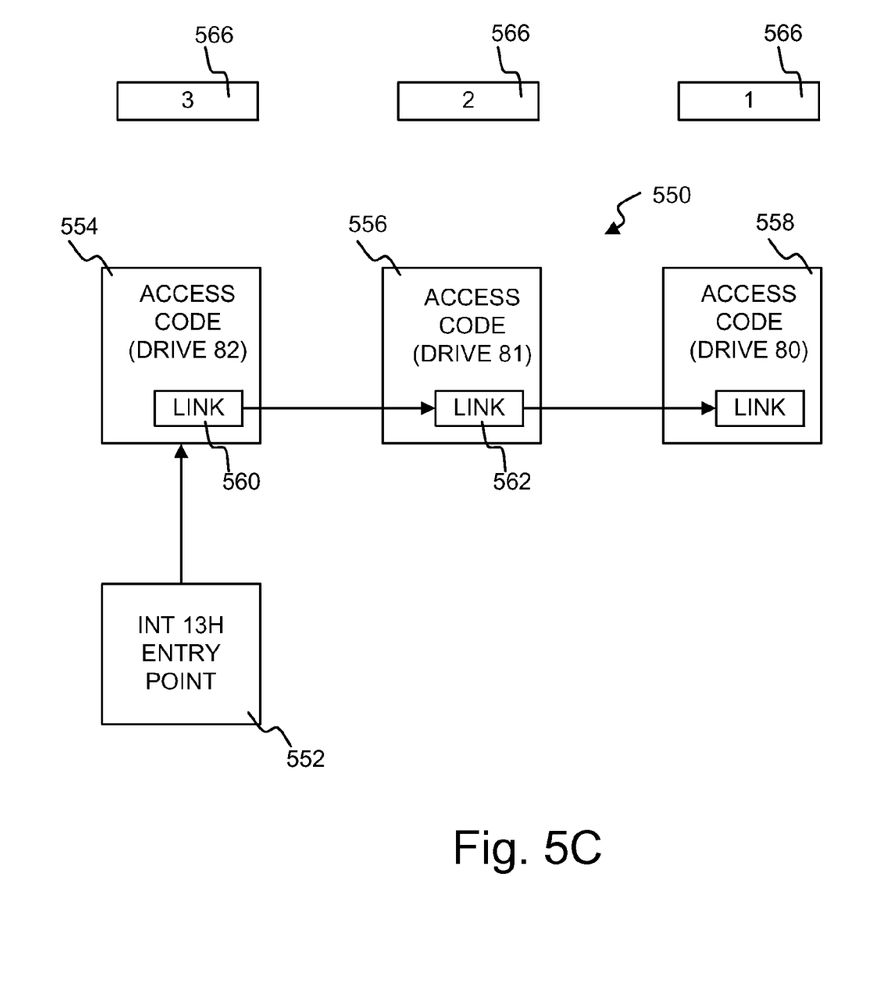

Turning now to FIG. 5C, additional details will be provided regarding the process utilized by a legacy BIOS to create an interrupt chain for accessing a mass storage device through a standard interrupt INT 13h call. As will be described in greater detail, this process is modified by the embodiments of the present invention to permit the utilization of BBS compliant devices in an EFI environment. As shown in FIG. 5C, an access chain 550 is created during execution of the BCVs for each connected device. In the example shown in FIG. 5C, three devices have been connected by executing their respective BCVs. During the execution of each BCV, a variable 566 is incremented thereby identifying the number of connected devices.

The execution of each BCV also causes a pointer to the access program code for each device to be added to the interrupt chain 550. In particular, as each BCV is executed, the previous value for the interrupt is saved and the access code for the current device is added to the chain. A link is then created to the previous device. For instance, as shown in FIG. 5C, when the first device is added, the value of the variable 566 is incremented to one. A pointer to the access code 558 is also added to the interrupt chain 550. When the second device is added, the variable 566 is incremented to two and the pointer to the access code 556 is added to the chain 550. A link 562 is also created to the access code 558 for the first device. When the third device is added by execution of its BCV, the value of the variable 566 is incremented to three and a pointer the access code 554 for the third device is added to the chain 550. A link 560 is created that points to the access code 556 for the second device. A pointer 552 representing the interrupt chain entry point always points to the head of the chain 550. As known to those skilled in the art, the interrupt chain 550 may be stepped through to execute the access code for each device when an interrupt INT 13h is generated.

As also shown in FIG. 5C, the first device added to the chain 550 is designated by the value 80h and is typically referred to as the "C:" drive in a legacy operating system environment. The next device added to the chain 550 is designated by the value 81h, the third device added is designated by the value 82h, and so on. As will be described in greater detail below with respect to FIGS. 6A-7, the variable 566 and the creation of the chain 550 are modified by the embodiments of the invention to present each BBS compliant device in the computer 100 as if it were the only device in the system (the device designated by the value 80h).

Figure 6A:
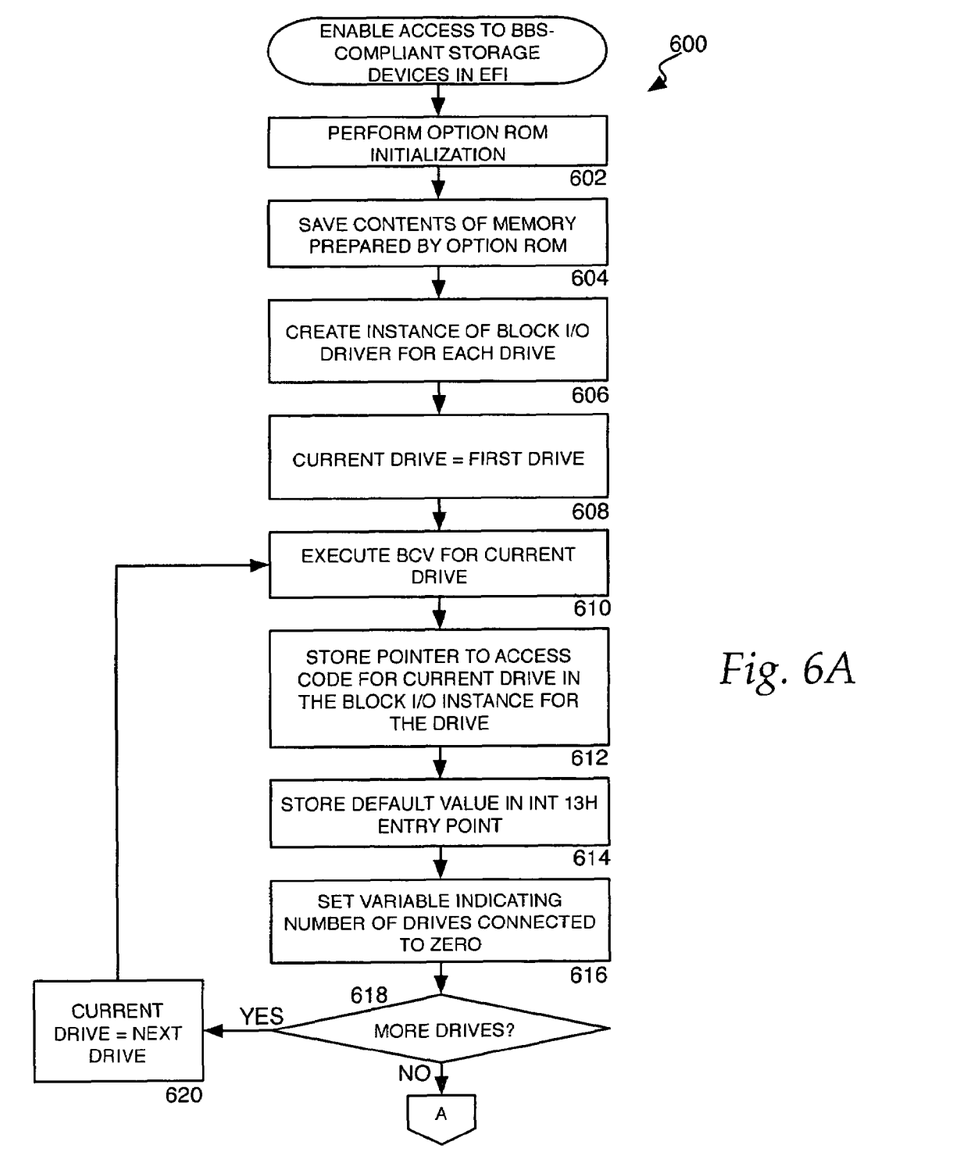
FIGS. 6A-6B are flow diagrams illustrating aspects of a process provided by embodiments of the invention for enabling access to BBS-compliant devices from within an EFI environment.
Figure 6B:
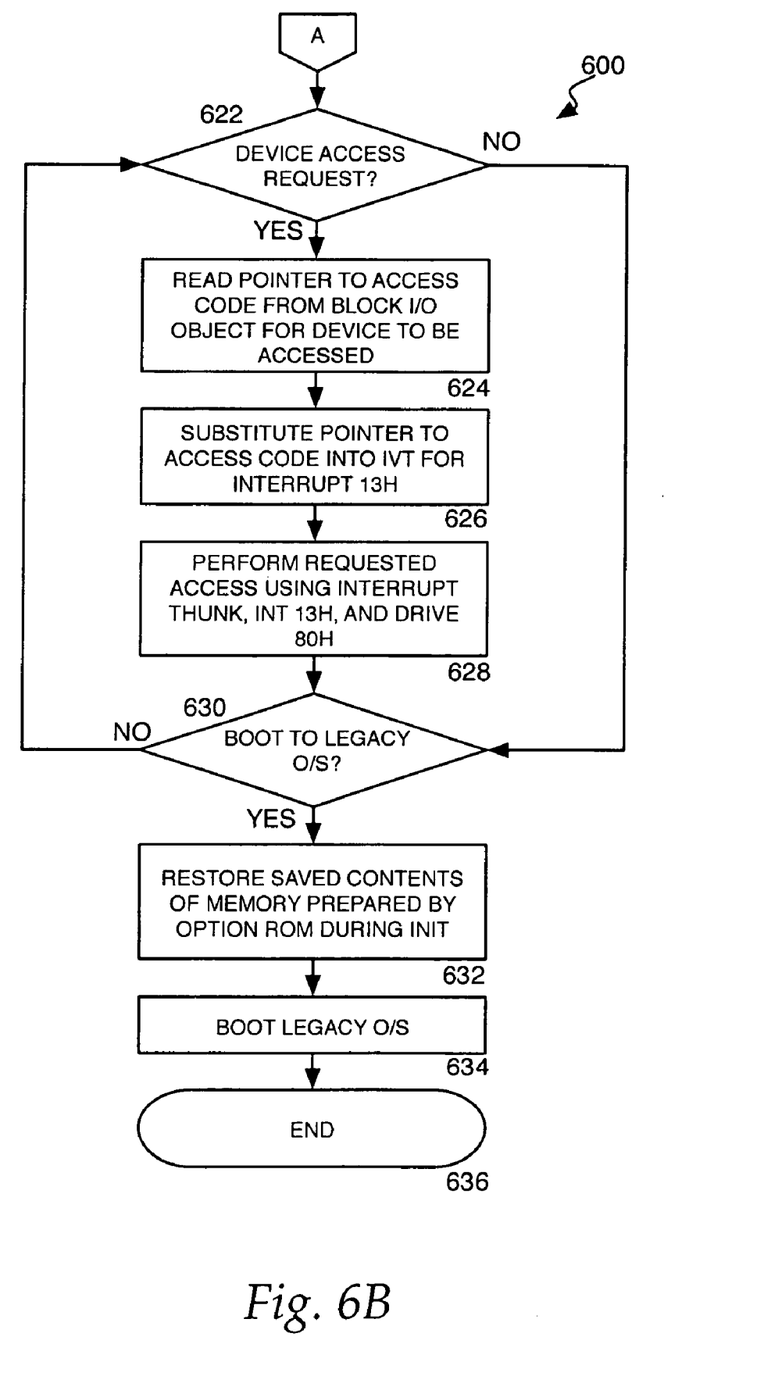
Figure 7:
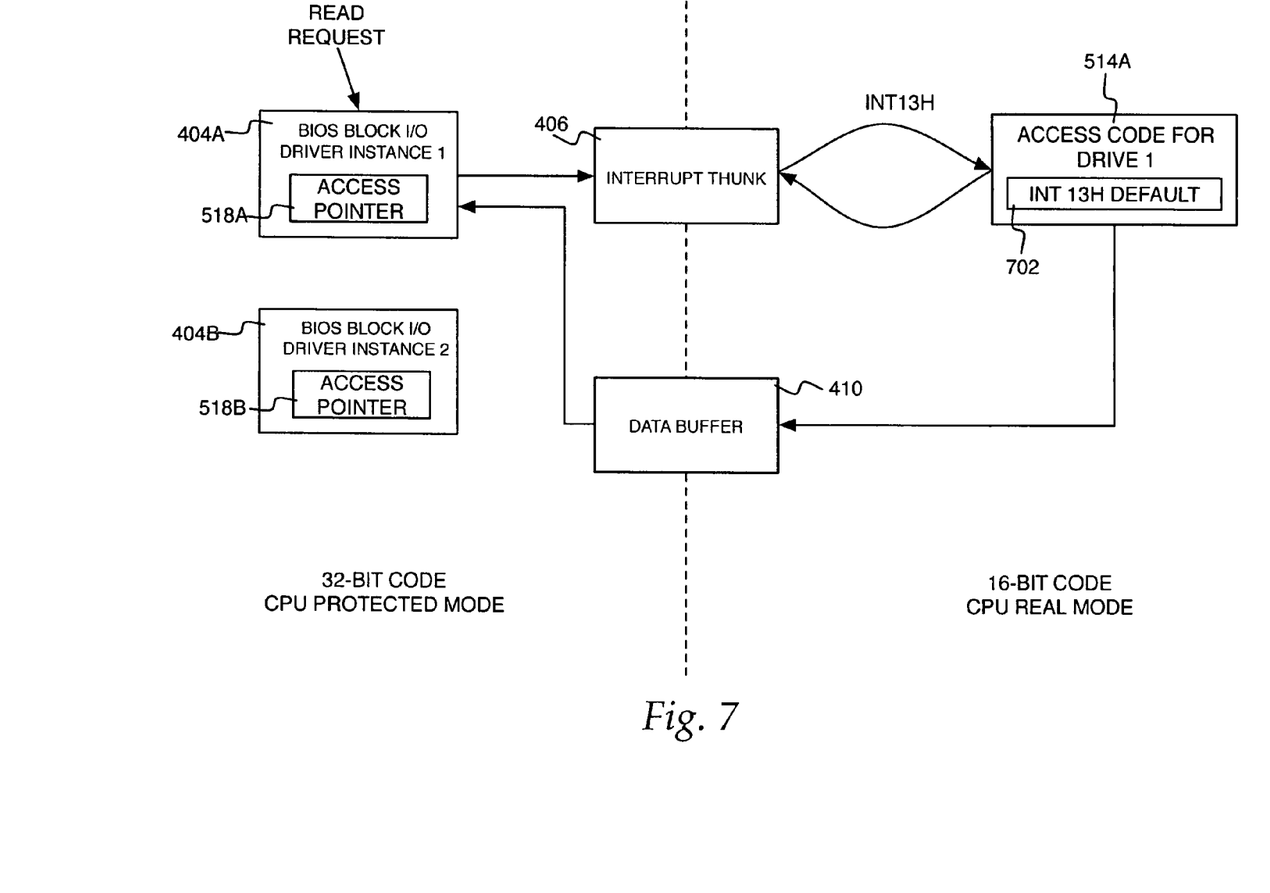
FIG. 7 is a block diagram illustrating additional aspects of a process provided by embodiments of the invention for enabling access to BBS-compliant devices from within an EFI environment.

Referring now to FIGS. 6A-6B and 7, an illustrative process 600 will be described for enabling access to one or more BBS compliant devices from within an EFI environment. The routine 600 begins at operation 602, where the option ROM 131 is initialized. As discussed above, during the initialization procedure of the option ROM 131, the connected devices are identified, and the BCV for each connected device is returned. Once the initialization procedure has been performed, the routine 600 continues to operation 604, where the contents of the memory prepared by the option ROM 131 during initialization is saved. This memory contains, among other things, the identities of the connected devices and the BCVs. As will be described in greater detail below, this memory is restored just prior to booting a legacy operating system. In this manner, the memory prepared by the option ROM 131 is presented to the operating system in the same condition it would have been in had the devices not been made available in the EFI environment. From operation 604, the routine 600 continues to operation 606.

At operation 606, an instance of the BIOS block I/O driver 404 is created for each connected device. For instance, in the example configuration shown in FIG. 7, two devices have been identified and an instances 404A and 404B of the BIOS block I/O driver 404 are created for each device. Once the instance of the BIOS block I/O driver 404 have been created, the routine 600 continues to operation 608, where a variable is initialized for keeping track of the current device. The variable is initialized to the value of the first device.

From operation 608, the routine 600 continues to operation 610, where the BCV for the current device is executed. As described above, in response to the execution of the BCV for a device, the device is connected and a pointer to the program code for accessing the device is returned. Once this process has been performed, the routine 600 continues to operation 612, where the returned pointer to the access code is stored in the instance of the BIOS block I/O driver for the device. For instance, in the example shown in FIG. 7, the access pointer 518A has been stored in the driver 404A. During a next pass, the access pointer 518B is stored in the driver 404B.

From operation 612, the routine 600 continues to operation 614, where a default value is stored in the interrupt chain. The default value causes the interrupt to return immediately after executing the access code for a device. Additionally, the value of the variable 566 is set to zero at operation 616. In this manner, the execution of the BCV for each device will cause the device to be initialized as if it is the only connected device (device 80h). By resetting the variable 566 and substituting a default value into the interrupt chain, the interrupt chain is not permitted to grow beyond a single entry. As will be described in greater detail below, this allows each device to be accessed from within the EFI environment as if it were the only device in the system.

From operation 616, the routine 600 continues to operation 618, where a determination is made as to whether additional drives remain to be connected. If additional drives remain to be connected, the routine 600 branches to operation 620, where the variable representing the current device is incremented to the next drive. The routine 600 then returns to operation 610, where the above process is performed again in the manner described above.

If, at decision operation 618, it is determined that all of the present devices have been connected, the routine 600 continues to operation 622. Proceeding to FIG. 6B, at operation 622, a determination is made as to whether a request to access one of the connected devices has been received. For instance, a request may be received to either read or write one of the connected BBS compliant devices. If such a request has not been received, the routine 600 branches to operation 630. If a request to access one of the devices has been received, the routine 600 continues to operation 624.

At operation 624, the pointer to the access code for the device to be accessed is read from the instance of the BIOS block I/O driver for the requested device. For instance, in the example shown in FIG. 7, if a read request is received for the first device, the access pointer 518A is read from the instance 404A of the block I/O driver. The routine 600 then continues to operation 626, where the access pointer is substituted into the appropriate entry (80h) in the interrupt chain for interrupt 13h. The routine 600 then continues to operation 628, where the requested access is performed utilizing the interrupt thunk 406 and the appropriate hardware/software interrupt handlers 408. When the access code 514A for the requested device is executed, it places the requested data into the buffer 410. Because the pointer to the access code for the requested device has been substituted into the interrupt chain, that device is accessed as drive 80*h* using INT 13h. Moreover, because a default value 702 was substituted into the interrupt chain during connection, the interrupt will return immediately following the execution of the access code 514A for the requested device. It should be appreciated that all connected devices are accessed from within the EFI environment in a similar manner using the interrupt thunk 406, as device 80*h*, and using INT 13.

From operation 628, the routine 600 continues to operation 630. At operation 630, a determination is made as to whether a request has been received within the EFI environment to boot a legacy operating system. If not, the routine 600 returns to operation 622, described above, where additional access requests are processed in the manner described above. If a request is received to boot a legacy operating system, the routine 600 continues to operation 632. At operation 632, the memory prepared by the option ROM 131 and saved at operation 604 is restored to its original location. The routine 600 then continues to operation 634, where the legacy operating system is booted. The legacy operating system may then issue the appropriate commands to connect the BBS compliant devices in a standard fashion. From operation 634, the routine 600 continues to operation 636, where it ends.

It will be appreciated that embodiments of the present invention provide methods, systems, apparatus, and computer-readable medium for enabling the use of BBS compliant devices in an EFI environment. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for enabling the use of one or more BIOS boot specification compliant devices within an extensible firmware interface environment, the method comprising:
    initializing an option ROM configured to provide support for the one or more BIOS boot specification compliant devices to identify a boot connection vector for each device;
    executing the boot connection vector for each device to obtain a pointer for each device to program code for accessing the device, and storing each pointer;
    receiving a request to access one of the devices from within the extensible firmware interface environment;
    in response to the access request, reading the pointer to program code for accessing the requested device, substituting the pointer into an interrupt vector table for accessing the device using the option ROM, and performing the requested access from within the extensible firmware interface environment using an interrupt thunk; and
    setting the value of a variable describing the number of connected devices to zero following the execution of the boot connection vector for each device.

2. The method of claim 1, further comprising:
    saving the contents of a memory prepared during the option ROM initialization prior to executing the boot connection vector for each connected device.

3. The method of claim 2, further comprising:
    receiving a request within the extensible firmware interface environment to boot an operating system; and
    in response to the request, restoring the contents of the saved memory just prior to booting the operating system.

4. The method of claim 1, further comprising storing a default value in a device access interrupt entry point following the execution of the boot connection vector for each device.

5. The method of claim 4, further comprising creating an instance of a block input/output device driver for each device, and wherein storing the pointer for each device to program code for accessing the device comprises storing the pointer within the instance of the block input/output device driver for the corresponding device.

6. A computer-controlled apparatus capable of performing the method of claim 1.

7. A computer-readable medium having computer-readable instructions stored thereon which, when executed by a computer, cause the computer to perform the method of claim 1.

8. A computer-readable medium having computer-executable instructions stored thereon which, when executed by a computer, cause the computer to:
    execute an option ROM initialization procedure to identify one or more BIOS boot specification compliant mass storage devices and to obtain for each storage device a boot connection vector;
    execute the boot connection vector for each storage device to obtain for each device a pointer to program code for accessing the device;
    receive a request from within an extensible firmware interface environment to access one of the BIOS boot specification compliant mass storage devices;
    in response to the access request, to utilize the pointer to the program code for accessing the requested device and an interrupt thunk to perform the requested access on the BIOS boot specification compliant mass storage device from within the extensible firmware interface environment;
    create an instance of a block input/output driver for each storage device identified during the execution of the option ROM initialization procedure;
    store the pointer to program code for accessing each device in the corresponding instance of the block input/output driver;
    store the contents of a memory prepared during the execution of the option ROM initialization procedure immediately following the execution of the procedure;
    receiving a request from within the extensible firmware interface environment to boot a legacy operating system;
    in response to the request, to restore the stored contents of the memory prepared during the execution of the option ROM and to subsequently boot the legacy operating system as requested; and
    set the value of a variable describing the number of connected devices to zero following the execution of the boot connection vector for each device.

9. The computer-readable medium of claim 8, wherein the BIOS boot specification compliant mass storage devices comprise SCSI mass storage devices.

10. The computer-readable medium of claim 8 having further computer-executable instructions stored thereon which, when executed by the computer, cause the computer to store a default value in a device access interrupt entry point following the execution of the boot connection vector for each device.

11. A computer system operative to provide access to BIOS boot specification compatible mass storage devices from within an extensible firmware interface, the computer system comprising:
- a BIOS boot specification compliant mass storage device controller comprising an option ROM storing program code for initializing, connecting, and accessing one or more mass storage devices connected to the controller;
- one or more mass storage devices connected to the controller;
- a central processing unit;
- a memory; and
- a non-volatile memory storing an extensible firmware interface firmware operative to cause the option ROM to initialize the one or more connected devices and to provide a boot connection vector for each connected device; to execute the boot connection vector for each device to obtain a pointer to code within the option ROM for accessing each device, to receive a request from within the extensible firmware interface environment to access a device and, in response to the request, to utilize the pointer to code for accessing the requested device and an interrupt thunk to access the requested device from within the extensible firmware interface environment;
- wherein the extensible firmware interface firmware is further operative to store the contents of a memory prepared during the execution of the option ROM initialization procedure immediately following the execution of the procedure, to receive a request from within the extensible firmware interface environment to boot a legacy operating system and, in response to the request, to restore the stored contents of the memory prepared during the execution of the option ROM and to subsequently boot the legacy operating system as requested, and to set the value of a variable describing the number of connected devices to zero following the execution of the boot connection vector for each device.

12. The computer system of claim 11, wherein the extensible firmware interface firmware is further operative to store a default value in a device access interrupt entry point following the execution of the boot connection vector for each device.

13. The computer system of claim 12, wherein the BIOS boot specification compliant mass storage devices comprise SCSI mass storage devices.

14. The computer system of claim 13, wherein the extensible firmware interface firmware is further operative to create an instance of a block input/output device driver for each device in the memory, and to store the pointer for each device to program code for accessing the device within the instance of the block input/output device driver for the corresponding device.

* * * * *